United States Patent
Eggert, Jr.

[11] 4,017,117
[45] Apr. 12, 1977

[54] ROOF HINGED DOOR IN AN AUTOMOBILE

[75] Inventor: Walter S. Eggert, Jr., Huntingdon Valley, Pa.

[73] Assignee: The Budd Company, Troy, Mich.

[22] Filed: Oct. 8, 1975

[21] Appl. No.: 620,902

[52] U.S. Cl. .............................. 296/146; 296/28 R
[51] Int. Cl.² ......................................... B60J 5/00
[58] Field of Search ............ 296/146, 28 R; 49/483

[56] References Cited
UNITED STATES PATENTS

| | | | |
|---|---|---|---|
| 2,903,296 | 9/1959 | Barenyi | 296/146 |
| 3,449,881 | 6/1969 | Wilfert | 296/146 XL |
| 3,511,530 | 5/1970 | Barenyi | 296/146 |
| 3,776,588 | 12/1973 | Sobajima et al. | 296/146 |
| 3,944,278 | 3/1976 | Takahashi et al. | 296/146 |

Primary Examiner—Joseph F. Peters, Jr.
Assistant Examiner—Gene A. Church

[57] ABSTRACT

A car includes a door hinged to the roof to be opened upwardly. A bottom side sill disposed towards the floor of the car is disposed to receive the bottom and side bottom edges of the door when it is closed. The side sill includes angularly disposed positions so that an inward impact of the door causes the bottom edges of the door to crush and lock into the side sill preventing the door from riding over the side sill.

Small lightweight cars, having doors hinged to the roof, and adapted to be opened upwardly, are well known. Also, well known are car bodies having foam plastic therein to provide a measure of safety in case of impact. In some cases, these bodies have a pair of platforms adapted to receive foam plastic therebetween in the floor area.

In attempts to increase gas mileage, efforts have emphasized minimizing the weight of the car. Very often, aluminum is used in place of steel or the thicknesses of the metals are reduced. In cases where the thicknesses of the metal used are reduced, it is important to compensate possible unsafe conditions in case of impact caused by the lighter weight metals collapsing under low impact conditions. When thicknesses of the metal used are reduced, the overall design of the car body must provide means to assure safety for individuals in the car at times of accidents involving relatively high impacts.

4 Claims, 3 Drawing Figures

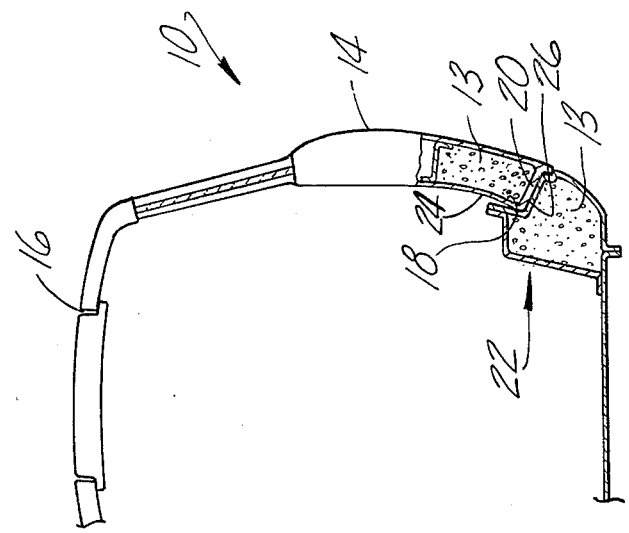
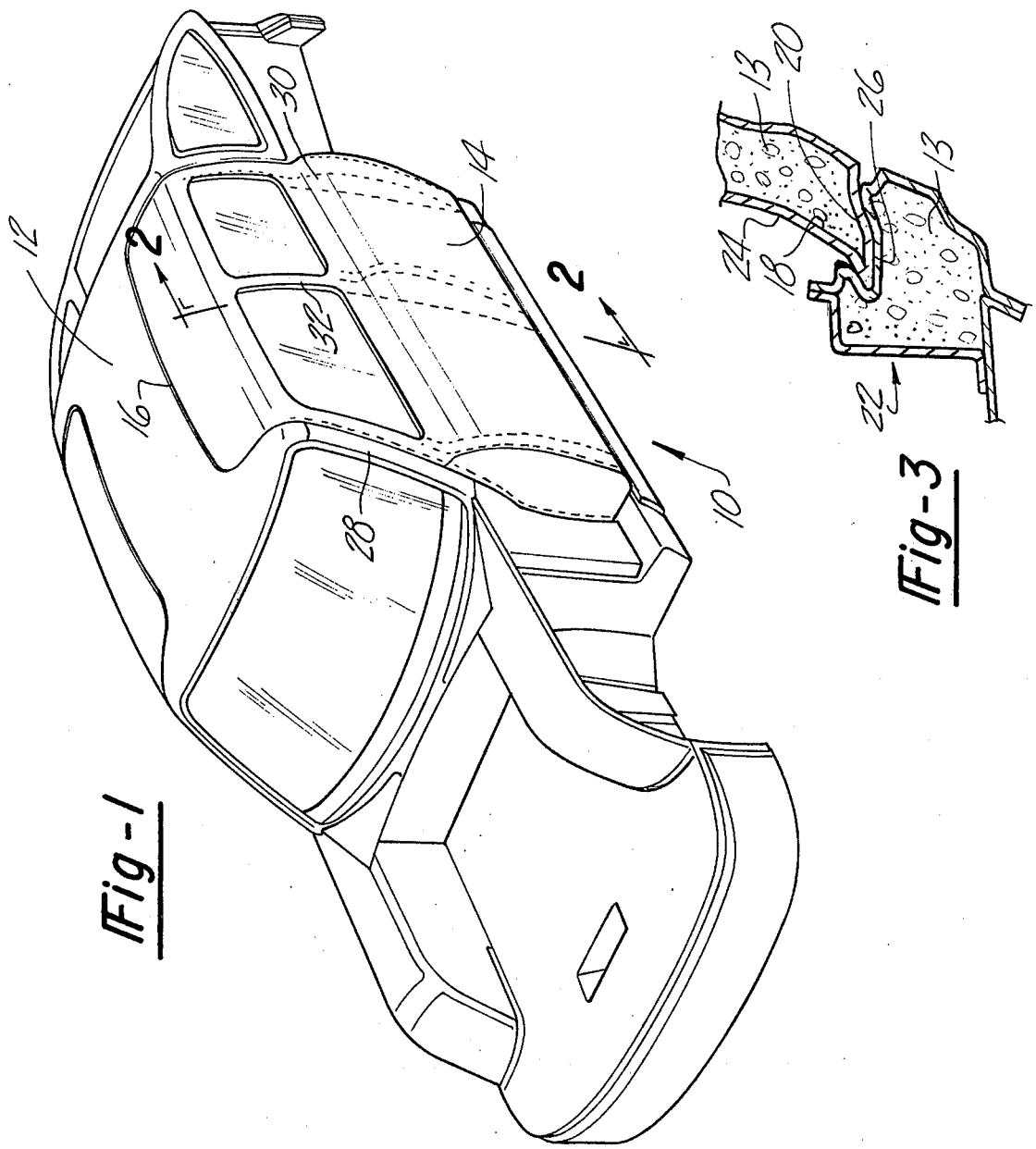

ROOF HINGED DOOR IN AN AUTOMOBILE

In accordance with the present invention, a door is hinged to the roof of a car to be opened upwardly. A side sill having first and second ledge sections perpendicularly disposed with respect to each other are dimensioned to receive the bottom and side edge portions of the door when the door is closed. The first ledge section of the side sill is offset outwardly from the vertical plane of the car body, with the second ledge portion being offset downwardly below the horizontal plane of the car body. Any inward collision of of the door causes the bottom portion of said door to crush and lock into the first ledge section of the side sill.

Other objects and advantages of the present invention will be apparent and suggest themselves to those skilled in the art, from a reading of the following specification and claims, taken in conjunction with the accompanying drawing for which:

FIG. 1 is an isometric view illustrating a portion of a car body embodying the present invention;

FIG. 2 is a cross sectional view taken along lines 2—2 of FIG. 2, and

FIG. 3 is an enclosed cross-sectional view of parts illustrated in FIG. 2 when the door of the car is subject to a side impact.

Referring particularly to FIG. 1 of the drawing, a car body 10 of a lightweight type having plastic foam 13 includes a roof 12 having a door 14. The door 14 is hinged to the roof 12 and adapted to be opened by moving the door about the pivot point 16. The various mechanisms for opening, closing and hinging the door 14 are not illustrated in detail because they are conventional and well known to those skilled in the art. For purposes of clarity, only the portions of the door and car body relating to the invention are illustrated in detail.

Referring to FIG. 2, the bottom portion of the door 14 includes an inside side edge 18 and a bottom edge 20. A side sill bulkhead structure 22 extends along the bottom of the car body 10. The side sill structure includes first and second ledge sections or surfaces 24 and 26 perpendicularly disposed with respect to each other adapted to receive therebetween the side edge portion 18 and the bottom edge portion 20 of bottom section of the door 14.

The inside side edge portion of the door 18 and the side surface 24 of the side sill 22 are both disposed at the same angle. This angle is offset outwardly away from the vertical plane of the car body. Likewise, the bottom edge portion 20 of the door 14 and the bottom surface 26 of the side sill 22 are both disposed at the same angle. This latter angle is offset downwardly away from the horizontal plane of the car body. As will be described, the angles of the bottom and side portions of the door and the bottom and side sections of the side sill are important to the present invention and provide a safety feature in the event of a high side impact against the door 14.

The main car body includes a forward post 28, sometimes referred to as an "A" post and a rear post 30, sometimes referred to as a "C" post. These posts 28 and 30 are disposed to receive the inside side edges of the door 14 when the door is closed. Such posts are known in conventional cars built heretofore and are generally used to provide protection from the door collapsing inwardly in case of side impacts or roll overs of the car in case of accidents upsetting the car.

To provide additional safety in case of high side impacts or roll overs, the door 14 is provided with a center post 32. A conventional four door car generally includes center posts between the front and rear doors, these posts being commonly referred to as "B" posts. The center post 32 of the door 14 may also be considered as the B post found in four door cars. Such B posts are not normally found in conventional two door automobiles of the type involving the present invention. The added center or B post 32 in the door 14 is designed to prevent the door from bending inwardly on impact or roll over.

Referring to FIG. 3, a condition is illustrated wherein the door 14 is subjected to a high side impact. The added center post 28 tends to maintain the door 14 in its same relative shape within limits depending on the magnitudes of the impact forces. Because of the angular dispositions of the inside bottom edge 18 and bottom edge 20 of the door along with the angular dispositions of the side surface 24 and bottom surface 26 of the side sill 22, the bottom edges of the door will be forced into and crush the side surface 24 of the side sill. The bottom portion of the door 14 will tend to lock into the side sill 22. This locking action will tend to prevent, within limits, the door 14 from entering into the interior compartment of the car. If the angles of the door edges and side sill surfaces, previously described, were not offset from the vertical and horizontal planes of the car, the tendency of the bottom edge of the door may be to ride over the side sill 22 and be forced into the interior component of the car.

For example, if the angles of the inside bottom portion 18 of the door and the side surface 24 of the side sill were vertical with respect to the plane of the door and the bottom edge 20 of the door and bottom surface 26 of the side sill were horizontal with respect to the plane of the car, then the tendency of the door to ride over the side sill would be greatly increased.

Thus, the angular arrangements of surfaces described, along with an added center post in the door, provides a safety feature which may permit the use of lightweight or metals of reduced thicknesses in an automobile to achieve efficient gas mileage.

What is claimed is:

1. A car body having a roof section, a door hinged to said roof disposed to be opened upwardly towards said roof and to be closed when moved downwardly against a side sill, said door including bottom and inside side portions, said side sill having first and second perpendicularly disposed ledge sections to receive the bottom and inside side portion of said door therebetween when said door is closed, said first ledge section of said side sill being offset outwardly from the vertical plane of the body of said car body, said second ledge portion of said side sill being offset downwardly below the horizontal plane of said car body whereby an inward impact of said door causes the bottom and inside portion of said door to crush and lock into said first ledge section preventing said door from riding over said side sill upon impact.

2. The invention as set forth in claim 1 wherein said bottom portion of said door is disposed at the same angle as said first ledge section of said side sill and said inside side bottom portion of said door is disposed at the same angle as said second ledge section of said side sill.

3. The invention as set forth in claim 2 wherein said car body includes front and rear vertical posts to physically engage the vertical side edges of said door when said door is in a closed position.

4. The invention as set forth in claim 3 wherein said door includes a vertical center post to reinforce said door.

* * * * *